July 6, 1943. J. D. NIXON 2,323,838
FLUID FLOW DEVICE
Filed April 1, 1940 6 Sheets-Sheet 1
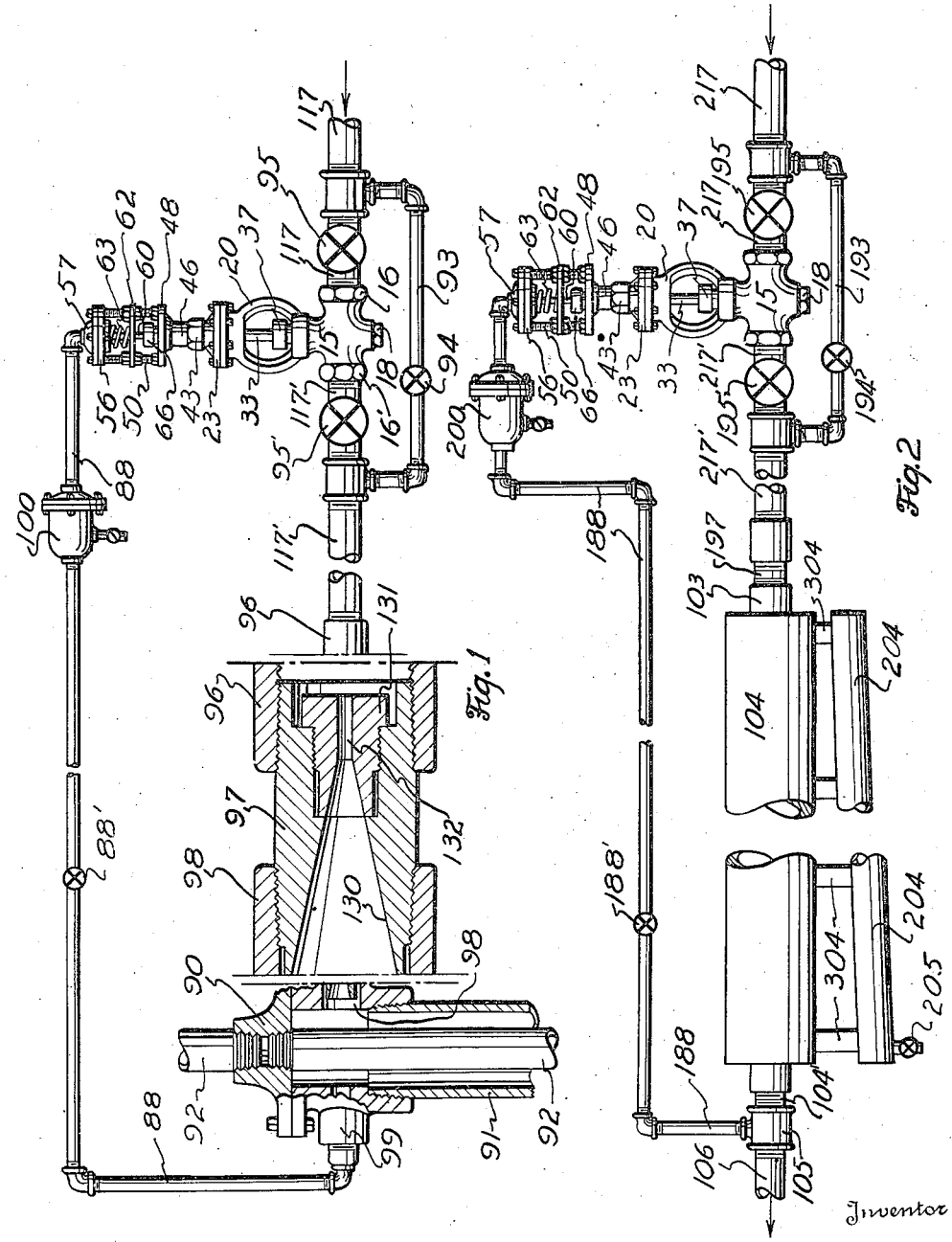
Inventor
Jeddy D. Nixon
By Jack A. Ashley, Jr.
Attorney

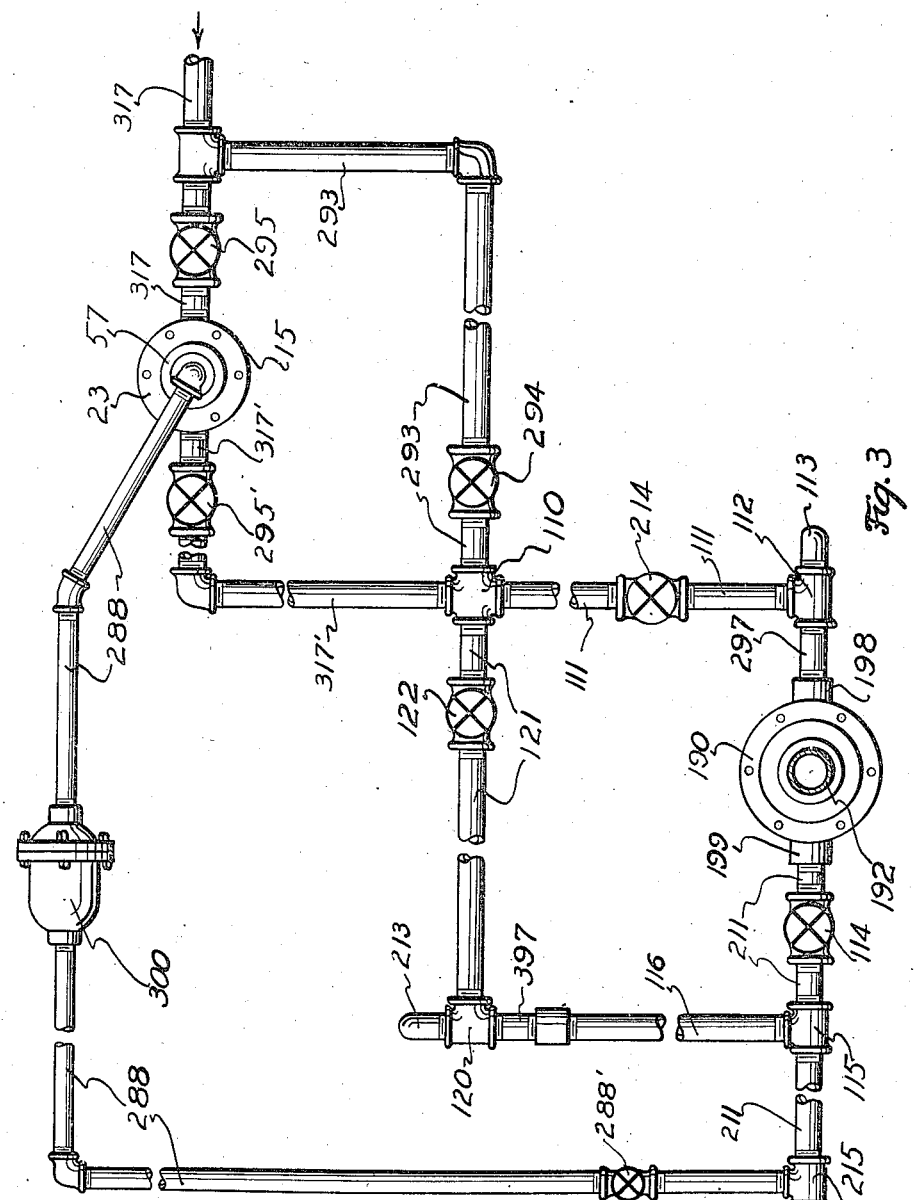

July 6, 1943.  J. D. NIXON  2,323,838
FLUID FLOW DEVICE
Filed April 1, 1940  6 Sheets-Sheet 4
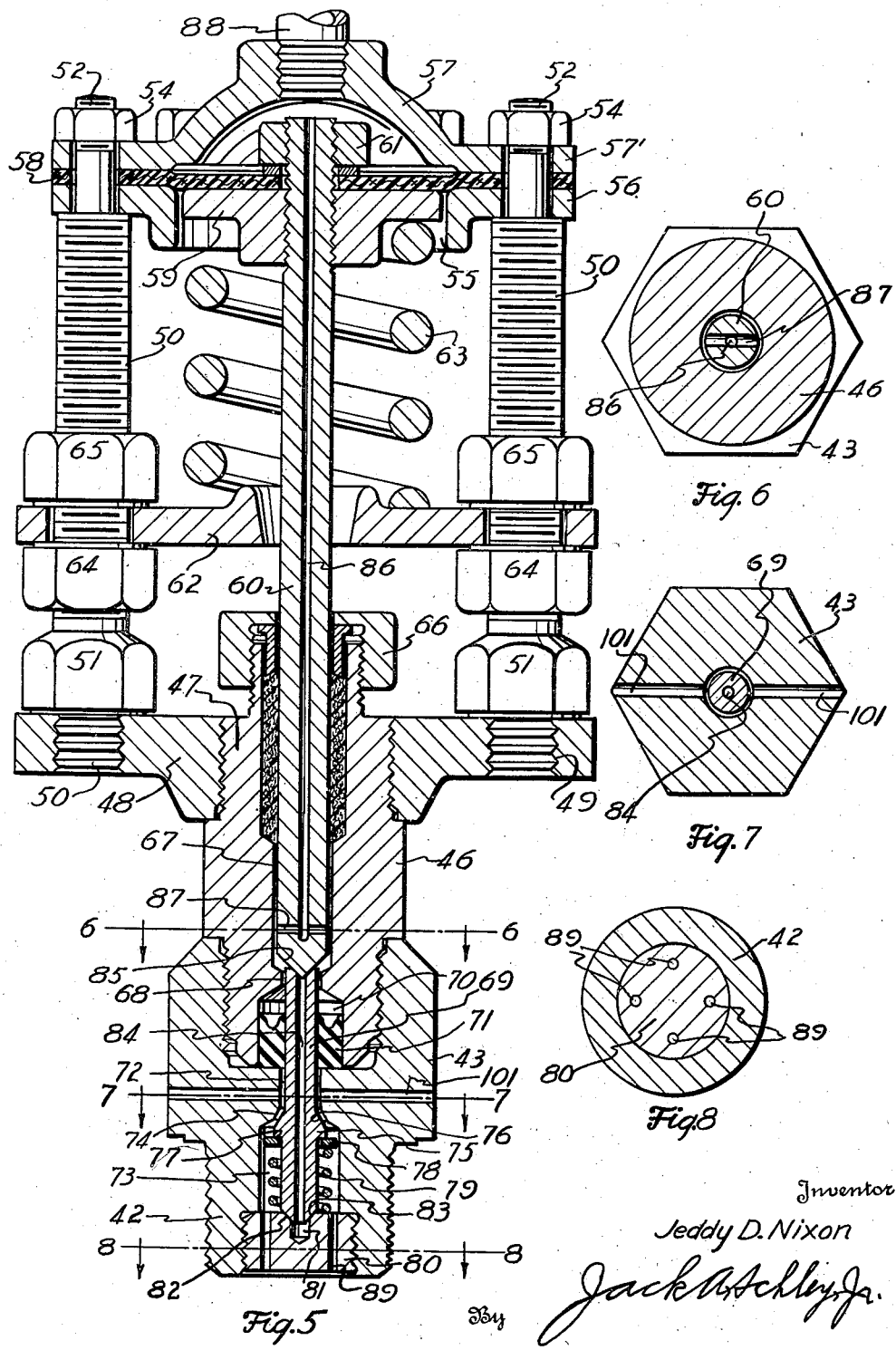
Inventor
Jeddy D. Nixon
By Jack A. Achley, Jr.
Attorney

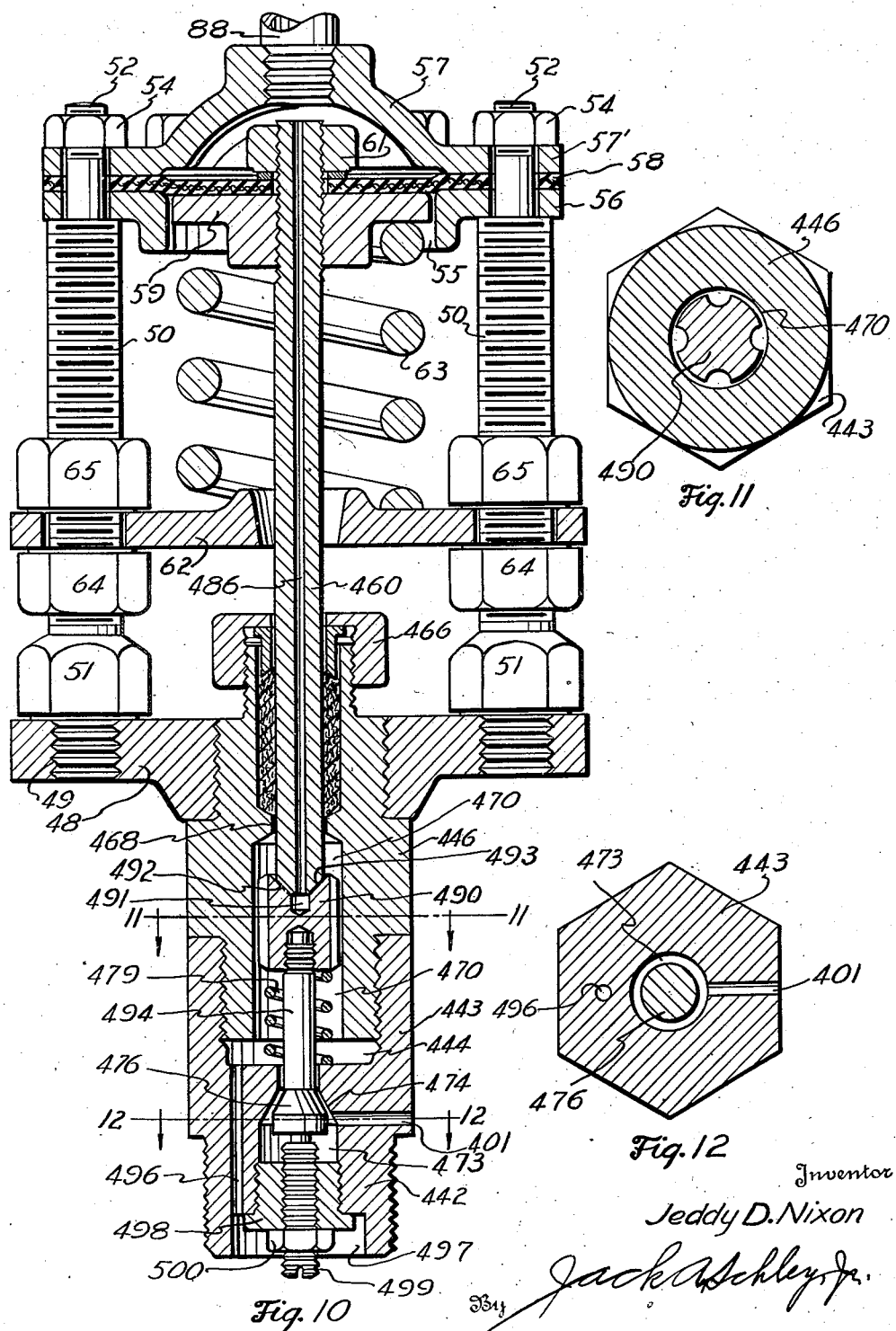

Patented July 6, 1943

2,323,838

UNITED STATES PATENT OFFICE 2,323,838

FLUID FLOW DEVICE

Jeddy D. Nixon, Houston, Tex.

Application April 1, 1940, Serial No. 327,181

21 Claims. (Cl. 50—11)

This invention relates to new and useful improvements in fluid flow devices.

The invention has to do with devices for regulating or controlling the flow of fluids, particularly fluids which flow from oil and/or gas wells, although the invention is not limited to use in the oil and gas industry. Primarily, such devices are employed where it is desired to control and maintain a desired working or flowing pressure of fluids, particularly high flowing pressures; and wherein pressure differentials are employed to motivate the valve. These devices are commonly called "regulators" and obtain their reduction by varying the restriction of the opening therethrough, but devices made in accordance with the invention herein have no intermediate function between a full open and a full closed position. When used in the flow stream of an oil and/or gas well, the device is connected in the flow line, either beyond the well head or in advance of any pressure reducer.

The devices now on the market, so far as I know, have three serious objections which have caused the trade to either discontinue their use or to add additional, expensive equipment with each device used. One of the main objections to the present-day devices, especially those connected in hydro-carbon flow lines, is that they freeze, which is caused by the moisture present in the fluid being controlled. Such freezing occurs in the body of the device, due to the drop of pressure across the openings therein. These devices employ reduction of pressure therein by permitting pressure to bleed off a diaphragm which gradually opens a valve to permit additional pressure fluid to flow therethrough. In other words, high pressure fluid is active on one side of a valve, and a reduced or lower pressure is counter-active on the other side of the valve; so that as the pressure on the low pressure side of the valve drops, the bleeding of low pressure fluid from the operating diaphragm begins, and the valve is opened slightly or "cracked" to admit additional fluid and again increase the reduced pressure fluid to the desired point, so that the actual reduction occurs through the partially opened valve.

Freezing is extremely objectionable, because it clogs the device and the same has to be shut down and thawed out, necessitating delay and expense as well as stopping the supply of fluid. The greater majority of pressure fluids have a certain amount of moisture therein, thus nearly every installation of a flow device is made with this fact in mind and additional devices are usually installed in complicated by-pass arrangements to serve as stand-bys to be used while the thawing and servicing of the frozen device is carried out.

Another of the serious objections to the flow control devices now in common use is that a slight opening of the valve in the body for controlling the flow of fluid therethrough will cause cutting and excessive wear on the valve and its seat, whereby in a short period of time the device leaks and naturally fails to control the flow of fluid.

Another objection to present-day flow control devices is equally as serious and this is that it is impossible to accurately reduce the supply of a fluid to a pre-determined pressure and to maintain the reduced flow at the desired pressure. The trade has accepted this variance of the desired pressure and in their calculations, where a flow device is used, allow for fluctuation.

Usually the pressure of the fluids when obtained from an oil and/or gas well is many times that desired or required to operate various equipment, such as gas-lifts, fire boxes of boilers, turbines and motors for driving various apparatus and numerous other equipment. This pressure fluid ordinarily is gas supplied from a well, but may be from a re-pressuring station, or a natural gasoline plant and the pressure of this gas may be normally as high as 2,500 to 5,000 pounds per square inch and in numerous instances, is much greater. A hydro-carbon fluid under high pressure is very dangerous and difficult to handle, particularly when used in field lines and in surface equipment. It is the usual practice to reduce such pressures to about 300 to 500 pounds per square inch, at which pressure the fluid is used. If this reduction in pressure can be accomplished at or adjacent the fluid flow source, then expensive high pressure field lines are not necessary and the danger of such pressures is restricted to the area adjacent said fluid source. The pressure of the supply of gas normally will fluctuate from several hundred pounds per square inch to several thousand pounds per square inch, and it is necessary to eliminate this fluctuation in the reduced field line pressure, because the efficiency and operation of the field equipment depends on the steady, even delivery of gas or pressure fluid.

In the installations of the now available flow devices, it is necessary to install heaters and numerous scrubbers or water knockout devices. These heaters are used to heat the high pressure gas, in order to reduce its tendency to freeze when a rapid reduction of gas occurs and this practice of heating is not only extremely dangerous, but it is also very expensive to install such heaters and operate and maintain the same.

One object of the invention is to provide improved means for overcoming these difficulties, whereby freezing of the mechanism will be eliminated, a substantially uniform pressure maintained, and excessive wear or injury to the working parts, due to valve restrictions, are prevented.

Another object of the invention is to provide an improved fluid flow device which will not freeze up, whereby the use of a heater or other expensive equipment therewith is not required.

Still another object of the invention is to provide an improved fluid flow control device which will set up a predetermined pressure and maintain this pressure with a few pounds differential between the pressure at which said device opens and the pressure at which said device closes, whereby the desired pressure will be held on the "downstream" or reduced side of said device.

A further object of the invention is to provide an improved flow control device which may be readily adjusted to maintain the desired reduced pressure, which adjustment may be easily made by an operator without special tools.

Still another object of the invention is to provide a fluid flow control device so constructed as to control the flow of any fluid from any suitable source and maintain an even, reduced flow of fluid, whereby any fluctuation of pressure in the source of fluid will not be transmitted to the reduced side of said device.

A further object of the invention is to provide a fluid flow control device which is so arranged that the actual reduction of pressure does not occur within said device, although the flow of fluid through said device is controlled, whereby any drop in pressure across the opening through said device is prevented.

Another object of the invention is to provide a fluid control device, the construction of which permits it to be so connected that a reservoir of reduced pressure fluid is obtained, whereby a volume of reduced pressure fluid may be used without causing excessive operation of said device.

Still another object of the invention is to provide a fluid flow device so constructed that excessive wear on the valve and seat therein is prevented, whereby leakage therethrough does not occur and positive regulation is had.

A further object of the invention is to provide a flow control device which is set to operate on a pre-determined differential between its opening pressure and its closing pressure, whereby the operation of said device is reduced to a minimum.

Still another object of the invention is to provide a fluid flow control device which will remain closed and not pass fluid until a pre-determined differential from the pressure at which the device closed has been reached at a point removed from said device, the valve in the fluid passageway is then fully opened and remains open until the same differential has been reached at this same point, whereby said valve is then completely closed. The opening and closing of this valve takes place rather quickly, so that no reduction, throttling, or metering of pressure fluid occurs at said valve.

A construction designed to carry out the invention will be hereinafter described, together with other features and objects of the invention.

The invention will be more readily understood from the following specification and by reference to the accompanying drawings, in which an example of the invention is shown, and wherein:

Figure 1 is a diagrammatic view showing a regulator, constructed in accordance with the invention, connected to a well;

Figure 2 is a similar view, showing the regulator connected in a pipe line;

Figure 3 is a diagrammatic view, showing the regulator connected into a distribution system where the casing of a well is used as a reduced pressure fluid reservoir;

Figure 5 is an enlarged, longitudinal sectional view of the control mechanism of the regulator;

Figure 6 is a horizontal, cross-sectional view taken on the line 6—6 of Figure 5;

Figure 7 is a similar view, taken on the line 7—7 of Figure 5;

Figure 8 is a horizontal, cross-sectional view taken on the line 8—8 of Figure 5;

Figure 10 is an enlarged, longitudinal sectional view of the control mechanism for the modified form;

Figure 11 is a horizontal, cross-sectional view taken on the line 11—11 of Figure 10; and Figure 12 is a similar view, taken on the line 12—12 of Figure 10.

Figure 4:
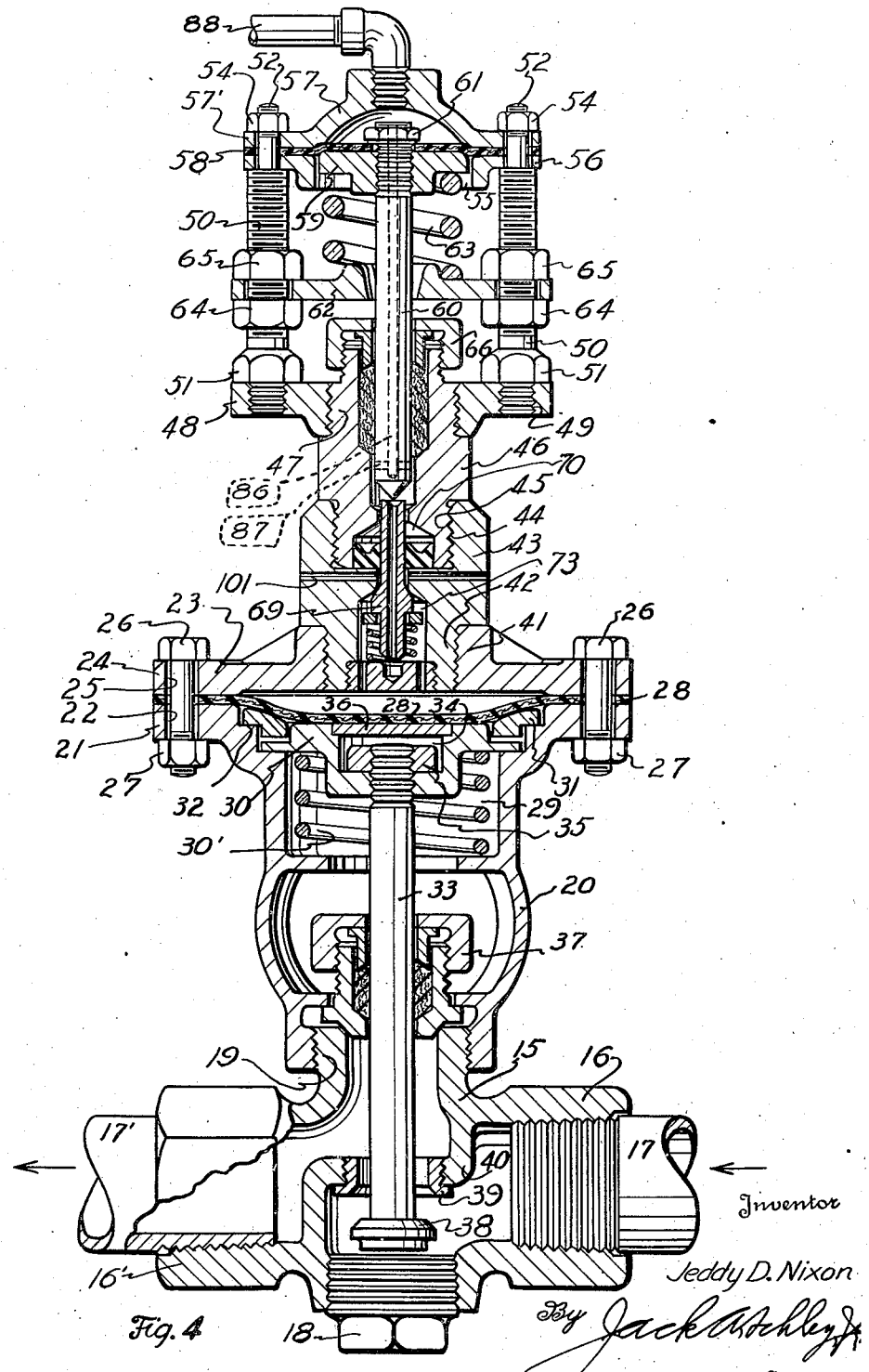
Figure 4 is a view, partly in section and partly in elevation, showing the details of the regulator which is in an open position to pass fluid therethrough.
Figure 9:
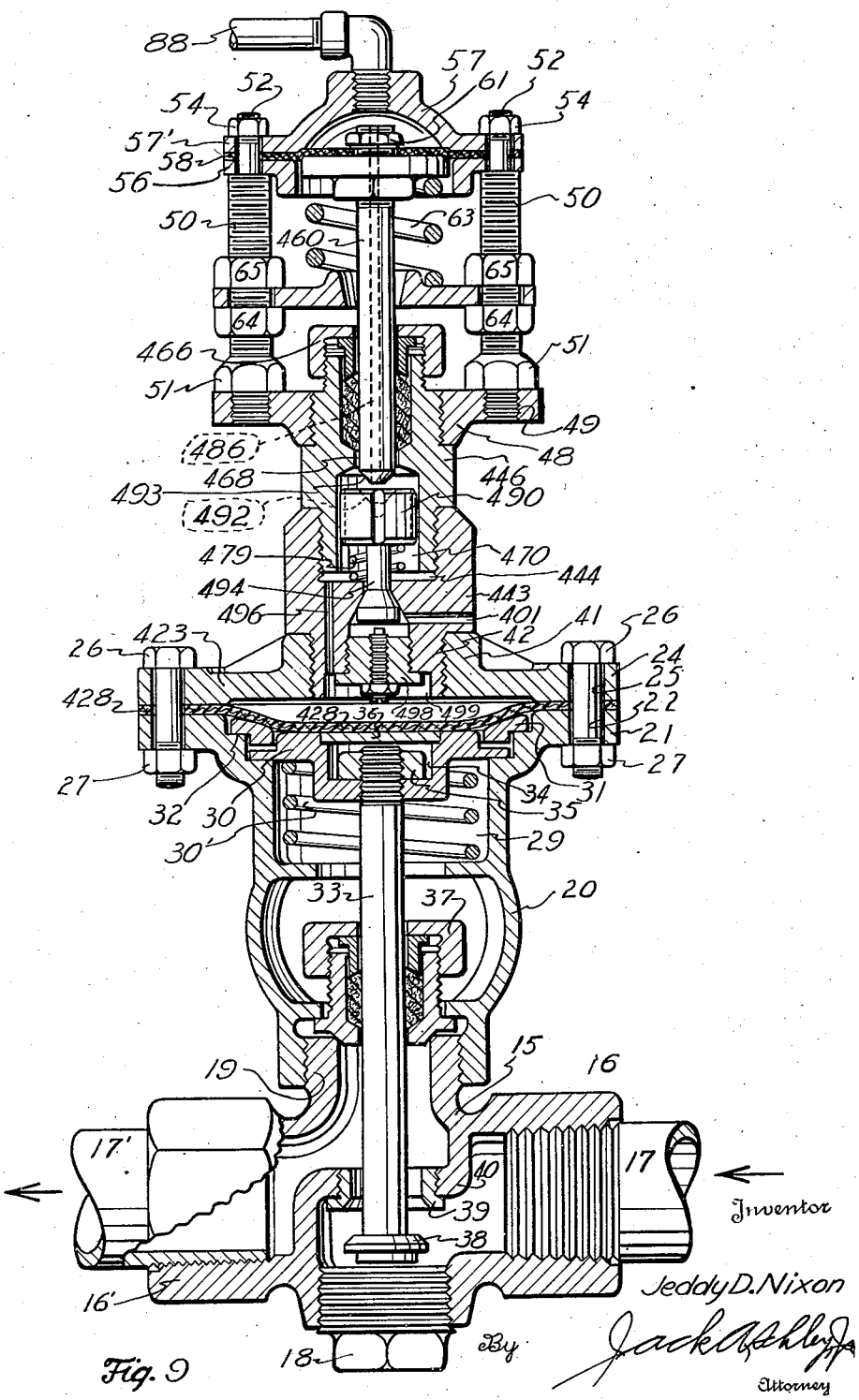
Figure 9 is an enlarged, detailed view of a modified form of the invention.

The numeral 15 designates a valve body having internally screw-threaded boxes 16 and 16' diametrically opposite each other for receiving the externally screw-threaded pins of an inlet pipe 17 and an outlet or discharge pipe 17'. The lower end of said body is provided with an externally threaded drain or cleanout plug 18. The upper end of said body is provided with an upstanding, externally screw-threaded boss 19 for receiving a supporting bracket 20. The upper end of this bracket is provided with a radially extending, external flange 21 having a plurality of bolt holes 22 therein. An annular crown or cap 23 is superimposed upon said bracket and is provided with a flange 24 similar to the flange 21, which is formed with a corresponding number of bolt holes 25. The flanges 21 and 24 are clamped together by a plurality of bolts 26 and nuts 27.

A suitable diaphragm 28 is clamped between the flanges 21 and 24 by said bolts 26 and nuts 27. The upper end of the bracket 20 is formed with a piston chamber 29 in which a piston 30 is reciprocably mounted and has its outer edge reduced to form a flange or supporting lip to receive an adapter ring 31, which is undercut to engage a shoulder 32 in said piston chamber 29, in order to limit the downward travel of said ring. The upper edge of said ring is beveled or rounded, so that no sharp corners or edges are presented to said diaphragm 28, whereby a more or less continuous, smooth surface, which together with the upper surface of the piston 30, is obtained for the underside of said diaphragm. The piston 30 is mounted on the upper end of an upright valve stem 33 extending downwardly therefrom and the upper surface of said piston is provided with an annular, axial sump or recess 34 for receiving a nut 35 for locking said piston on said valve stem 33. This recess 34 is closed by a flat, circular plate or disk 36, so as to form a continuous surface across said recess with the upper surface of said piston.

The valve stem 33 extends downwardly through a stuffing box 37 mounted on the upper end of the boss 19 of said valve body 15. The lower end of said valve stem is provided with a flat, annular valve member 38 for engaging a removable seat 39 threaded into a transverse partition 40 in said valve body 15 (Figure 4). It will be seen from Figure 4, that the flow of fluid from the pipe 17, through the valve body 15, to the pipe 17' will be controlled by the opening and closing of the valve member 38 on the seat 39 in said partition 40. The drain plug 18 permits the easy removal of said valve stem 33 and said seat 39, as well as replacement of these parts in case of wear or damage.

The upper end of said cap 23 has an axial, screw-threaded opening 41 for receiving a reduced, externally screw-threaded pin 42 depending from a collar or nipple 43 for supporting the same. The upper end of this collar is formed with an internally screw-threaded box 44 for receiving a reduced, externally screw-threaded pin 45 of a nipple or coupling member 46, which has an upstanding, screw-threaded pin 47 for receiving an oblong, supporting web or bracket 48. The outer ends of this web are provided with screw-threaded bolt holes 49 for receiving upright stud pins or bolts 50. The lower ends of each of said stud bolts 50 are provided with a hexagonal boss 51 to limit the engagement of said bolts into said web 48, as well as to give additional support to said bolts. The upper ends of each of said bolts are provided with a reduced, upstanding, co-axial pin 52, the upper ends of which are threaded to receive nuts 54. These pins 52 receive an annular piston chamber 55 having an external, radially extending flange 56, which is formed with bolt holes for engaging over said reduced pins. A concavo-convex crown or cap 57, having a similar flange 57', is mounted on said pins 52 on top of a circular diaphragm disk 58 so that said nuts 54, bearing against the upper surface of said cap 57, will clamp said diaphragm 58 between said piston chamber 55 and said cap 57.

A flat, circular piston 59 is mounted within said piston chamber 55 beneath said diaphragm 58 and upon the upper end of a piston rod 60. The piston 59 and the piston rod 60 are clamped to said diaphragm 58 by a nut 61 upon the upper surface of said diaphragm, so that said piston and said rod move with said diaphragm. An oblong spring support or web 62 surrounds said piston rod 60 and is mounted on said stud bolts 50 intermediate their ends for supporting and exerting a tension on a coiled spring 63, the upper end of which engages beneath said piston 59. For adjusting the tension of said spring 63 on said piston, said piston rod and said diaphragm; a pair of nuts 64 and 65 are threaded onto each of said stud bolts 50 with the nuts 64 supporting said web 62 and the nuts 65 being above said web to lock the same against said nuts 64, so that by screwing the nuts 64 up or down, the tension of said spring 63 may be increased or lessened, and the nuts 65 tightened against said web to clamp the same against said nuts 64.

The piston rod 60 extends downwardly through a stuffing box 66 formed on said pin 47 of said coupling member 46. The axial bore 67 of said coupling member has a reduced portion 68 which serves as a guide for the upper end of a co-axial, upstanding, tubular pin or dart 69. This dart extends down through the reduced pin 45 and depends therefrom, through said collar 43 into the reduced pin 42 of said collar. The lower end of the axial bore 67 of the reduced pin 45 of said coupling member 46 is counterbored at 70, below said guide 68, to accommodate an expandable packing or sealing ring 71 which surrounds said dart 69, so as to close off the axial bore 67 of said coupling member 46 from the bore 72 of said collar 43. The lower end of the bore 72 of said collar 43 is counterbored at 73, whereby a ground, tapered seat 74 is formed on the shoulder between said counterbore 73 and the bore 72.

The dart 69 is externally upset or thickened intermediate its ends so as to provide an external, annular boss 75, the upper surface of which is tapered to form a valve face or member 76 and a shoulder 77 is formed on its lower surface. A stop washer or ring 78 is slidably mounted within said counterbore 73 around the lower end of said dart beneath said boss 75, so that its upper face may engage the shoulder 77. A small, coiled spring 79 is mounted within said counterbore 73 beneath said ring 78 to exert an upward tension or thrust on said ring 78, on said shoulder 77 and on said dart 69, whereby said valve face 76 will be held against its seat 74. A perforated plug 80 is threaded into the lower end of said counterbore 73 to support said coil spring 79 and to limit the downward travel of said dart 69. The upper surface of said plug 80 is provided with a co-axial sump or recess 81, the upper end of which is counterbored so as to form a seat 82 to receive the tapered end or valve face 83 on the lower end of said dart 69. Said dart 69, being tubular, is provided with an axial bore or passageway 84 extending therethrough and the upper edge of said passageway 84 is counterbored to receive the tapered lower end 85 of said piston rod 60. The piston rod 60 is provided with an axial passageway 86 extending from its upper end to within a short distance of the lower end of said rod and a plurality of radial ports 87 extend outwardly from the lower end of said passageway 86 through the wall of said piston rod 60.

It will be seen in Figure 4, that pressure fluid may enter from a pipe 88 into the cap 57 above said diaphragm 58 and into the bore 86 of said piston rod 60 and out through said radial ports 87. The tapered face 85 of said piston rod 60, being spaced from the counterbored upper end of said dart 69, will permit this pressure fluid to flow through the passageway 84 of said dart into the counterbore 73 above the perforated plug 80. Inasmuch as said piston rod 60 is not engaging the upper end of said dart 69, said spring 79 will lift said dart and hold said valve face 76 against the valve seat 74, whereby the tapered end 83 of said dart will not engage the seat 82. It will be seen that said pressure fluid will flow from the passageway 84 into said counterbore 73, through the perforations 89 of said plug 80, onto the upper surface of said diaphragm 28 and when sufficient fluid has accumulated upon said diaphragm, the same will be expanded which depresses said piston 30, said valve stem 33 and said valve member 38, which opens the port through the partition 40, as is shown in Figure 4. It is pointed out that the spring 30' is a very light spring and merely serves to hold the valve member 38 in engagement with its seat 39, while said regulator is being shipped. As soon as the fluid accumulating above said diaphragm 28 has expanded sufficiently to slightly open or crack said valve 38 from its seat 39, the flow of pressure fluid through said seat will partially equalize the pressure on both sides of said seat, which will permit said valve member to immediately drop to a full open position, whereby fluid may flow from said pipe 17, through said valve body 15, into said pipe 17'.

In operation, inasmuch as the regulator is used to reduce a relatively high pressure and sometimes a fluctuating pressure to a lower, steady pressure, I have shown in Figures 1 and 2, two hookups where a regulator of this type may be used. In Figure 1, the invention is illustrated as connected to the usual casing head 90 of a well, in which it is desired to maintain approximately a given pressure in the casing 91 around the tubing or flow string 92. The usual field line or high pressure supply line 117 is connected into the box 16 of the valve body 15 and the outlet box 16' receives one end of a connecting pipe 117'. Of course, the usual by-pass pipe 93, with a suitable, manually operated gate or "shut-off" valve 94 mounted therein, connects pipe 117 with pipe 117' around the regulator valve body 15. A similar gate valve 95 is connected in said line 117 between the valve body 15 and the inlet end of said by-pass 93 and a similar valve 95' is connected in the line 117' between the valve body 15 and the outlet end of said by-pass, so that by operating said valves 94, 95 and 95', the flow of fluid from pipe 117 may be through said by-pass 93 or through said regulator valve body 15. The other end of the pipe 117' is connected into a collar 96 which is connected to one end of a suitable Bell choke 97. This choke 97 is screwed into one of the usual outlets 98 of said casing head 90 and has a flared opening 130 in one end with a removable flow bean jet 131 threaded into its other end. This jet has a bore 132, of whatever diameter it is necessary to have the flow opening in said choke to restrict the flow of fluid through said choke, as desired. Thus, by installing a jet with the proper bore, any flow desired may be obtained. It will be seen that the restricted portion of said bore 132 of said jet 131 terminates in a flared passageway that corresponds to the flared opening 130 of said choke 97, so that a continuous, flared opening or surface is had. The discharge end of said choke has an extended flange, in order that said flared opening may be carried into the pipe or collar with a very slight difference between the inside diameter of said opening and the inside diameter of the pipe or collar into which said choke discharges. The pipe 88 extending from the pilot valve cap 57 is connected to one of the other outlet openings 99 of said casing head 90, which is preferably diametrically opposite the outlet opening 98. The pipe 88 is preferably provided with a manually operated gate valve 88' and with a suitable screen or strainer 100, which will remove all foreign matter to prevent the same entering said cap 57 and causing damage or unnecessary wear to said regulator operating mechanism.

This regulator enables the port in the partition 40 to be fully opened or completely closed, so that when fluid is flowing through said regulator, its passage will not be restricted nor will any reduction of pressure occur in said valve body 15 cross the port of said partition. When said valve member 38 is in its open position, there will be approximately the same pressure in pipe 117' as there is in pipe 117. Naturally, a reduction in pressure will occur through said choke 97. Substantially the same pressure as that carried in said casing 91 will be present in said pipe 88 and said cap 57 on top of said diaphragm 58, as well as in said passageway 86 of said piston rod 60, said passageway 84 of said dart 69 and on top of said diaphragm 28. As the pressure builds up in said casing, the pressure in said pipe 88 and in the controlling mechanism of said regulator is increased. When this pressure has increased to the point where the tension of said spring 63 is overcome, said piston 59 and said position 60 are moved downwardly until said tapered lower end 85 of said rod engages in the counterbore at the upper end of said passageway 84 of said dart 69, which terminates the admittance of pressure fluid into said passageway 84.

As the pressure continues to increase on said diaphragm 58, said piston 59 and piston rod 60 are moved further downward carrying the dart 69 therewith, so as to disengage said valve member 76 from its seat 74 (Figure 5). The dart 69 will be moved downwardly until its tapered lower end 83 engages within said seat 82 of said perforated plug 80. As soon as said valve face 76 leaves said valve seat 74, the fluid within said counterbore 73 and on top of said diaphragm 28 will flow past said valve seat 74 into said bore of said collar 43 and will be vented to the atmosphere through radially extending ports or vent passages 101. As the pressure within said counterbore 73 of said collar 43 and above said diaphragm 28 is vented through said passages 101; said piston 30, due to the flow of pressure fluid through said port in said partition 40 around said valve stem 33, will move upwardly against this reduced pressure, carrying said valve stem 33 and valve member 38 onto its seat 39 to close the opening through said partition 40 in said valve body 15, whereby the flow of fluid from pipe 117 to pipe 117' is terminated. The coiled spring 30' may assist in closing said valve member 38, but it is not essential therefor, as the regulator will operate as satisfactorily without it. It is pointed out that a quick opening and closing valve is had, so that said valve snaps open or closed and does not permit any bleeding through said port or reduction of pressure in said valve body 15.

When the pressure in said casing 91, said pipe 88 and in said cap 57 on said diaphragm 58 has been reduced sufficiently; said piston 59, piston rod 60 and dart 69 will gradually move upwardly until said valve face 76 engages said valve seat 74, which terminates the upward movement of said dart. The continued reducing of pressure on said diaphragm will permit said piston rod 60 to move upwardly, due to the tension of said spring 63, whereby the tapered lower end 85 will disengage from the upper end of said dart which opens said passageway 84, so that the pressure fluid in said axial bore 67, said passageway 86 of said piston rod 60 and on top of said diaphragm 58, will flow through said passageway 84 of said dart, into said counterbore 73 of said collar 43 and on top of said diaphragm 28. When this occurs, said diaphragm, said piston 30, said valve stem 33 and said valve member 38 will be depressed and the opening through said partition 40 will again be opened, in order that fluid may once more flow from said line 117 through said valve body 15 into said line 117'.

Figure 2 illustrates how the regulator may be used in a pipe line with the pipe 217 being the high pressure or source of pressure fluid connected to said regulator valve body 15 and the pipe 217' leading from said valve body. The usual by-pass 193 and gate valves 194, 195 and 195' are used with this type of installation, as well. The same type of choke 197 is installed approximately the same distance, as shown in Figure 1, which is usually one joint of pipe. However, the outlet end of said choke instead of being connected to the usual casing head has a collar 103 threaded thereon for connecting this end of said choke to the end of a pipe 104, approximately the same length as the pipe 217'. This pipe 104 is of a larger diameter than the pipes 217 and 217' to form a scrubber chamber or water knockout device, in order to catch any condensation that may occur. A smaller pipe 204, forming a collecting chamber, is suspended from and connected to said scrubber chamber 104 by tubular uprights 304, so that any condensation may drop or flow through said uprights down into said collecting chamber 204, from which it may be periodically drained by a suitable pet cock 205. The opposite end of said pipe or scrubber 104 is connected to a T connection 105 by a short nipple 104', which T has a delivery pipe 106 connected to its other end for conveying the regulated pressure fluid to the point desired. The pipe 188 extending from said cap 57 is connected to the third leg of said T connection 105 for receiving the reduced pressure fluid for actuating the control mechanism of said regulator, as has already been described. It is preferred to mount a suitable strainer 200 in the pipe 188, as well as a gate valve 188', in this type of installation, the same as in Figure 1.

In Figure 3 is illustrated an improved system of connecting a regulator for delivering a predetermined, reduced pressure to a number of wells or other points where a volume of reduced pressure is required, whereby a reserve volume is maintained without excessive operation of said regulator. The high pressure supply line 317 is connected to said box 16 of said valve body 15 and the outlet pipe 317' is connected to said box 16' of said regulator valve body, the same as has already been described. This pipe 317 has a by-pass 293 connected therein ahead of said regulator valve body 15, which by-pass contains a manually operated gate valve 294. A similar gate valve 295 is connected in said pipe 317 between said regulator and said by-pass inlet end and another gate valve 295' is connected in said pipe 317' between the outlet end of said by-pass and said regulator. This pipe 317' leads to a cross connection 110 into which said by-pass 293 is connected. A pipe 111 is also connected into said cross connection 110 diametrically opposite said pipe 317' and extends to one leg of a T 112. The pipe 111 has a suitable, manually operated gate valve 214 mounted therein intermediate its ends. This T 112 has a suitable bull plug 113 connected into another leg and a Bell choke 297, similar to said chokes 97 and 197 described in Figures 1 and 2, has one end screwed into the other leg of said T 112.

The bull plug 113 may be removed to change or replace the flow bean (not shown) of said choke 297 whenever desired. The other end of said choke 297 is screwed into one of the outlet openings 198 of a casing head 190, similar to Figure 1, whereby any fluid flowing through said choke will be exhausted directly into said casing head 190 and the casing (not shown) depending therefrom. The other outlet opening 199 of said casing head has an outlet or delivery pipe 211 connected therein and extending therefrom. A suitable gate valve 114 is mounted in said pipe 211 between said casing head and a T connection 115. A by-pass pipe 116 is screwed into one leg of said T 115, so as to be connected to said pipe 211. This pipe 116 is connected to one end of a Bell choke 397, similar to the other chokes, which exhausts into said pipe. The other end of said choke 397 is mounted in one leg of a T connection 120, which has a suitable bull plug 213 connected therein for replacing or changing said flow bean (not shown) of said choke. The other leg of said T 120 has one end of a by-pass pipe 121 screwed thereinto, which extends to said cross connection 110. A suitable, manually operated gate valve 122 is mounted in said pipe 121. It is pointed out that with this connection or system, said regulator 15 may be cut out to be repaired or replaced, or the well beneath said casing head 190 may be by-passed whenever it is necessary to pull the tubing string 192 or to work on this well. Thus, it will be seen that a simple yet very efficient system is provided where one well serves as a key well or a reservoir for a number of wells or other equipment. Of course, this well may or may not be using gas from the reservoir its casing forms.

The pipe 211 has a T connection 215 mounted therein, which has one end of a pipe 288 screwed into one leg. A suitable gate valve 288' is connected in said pipe 288, which extends from said T 215 to said pilot valve cap 57. This pipe 288 also has a suitable strainer 300, similar to the other strainers, mounted therein for removing all foreign matter from said pressure fluid flowing through said pipe.

In Figures 9 to 12 inclusive, a slightly modified form of the control mechanism or pilot valve for said regulator has been shown. This modified form operates substantially the same as the first form, although the structure has been changed to a small degree. The passageway 486 of the piston rod 460 extends entirely through said piston rod instead of terminating within said rod and the reduced portion 468 of the bore 470 of said coupling member 446 is at the upper portion of said bore to support the packing in the stuffing box 466. A slidable, fluted guide member 490 is loosely mounted in said bore 470, the upper edge of which is formed with a sump or recess 491. The upper end of said sump is counterbored to form a valve seat 492 for receiving the tapered lower end 493 of said piston rod 460, which when engaging said seat 492, closes said passageway 486.

The lower end of said guide member has a short valve stem 494 threaded thereinto and depending co-axially therefrom. A small, coiled spring 479 surrounds said valve stem 494 beneath said guide member 490 and rests upon the bottom of the box 444, in order to exert an upward tension upon said guide member and said valve stem. The bore 473 of the collar 443 has its upper end reduced to form a tapered shoulder or valve seat 474, which is engaged by a valve member 476 on the lower end of said valve stem 494, to close off said bore 470 and box 444 from said bore 473. This bore 473 of said collar 443 is provided with a radially extending, vent port or passageway 401 for venting pressure fluid from said box 444, said bore 470 and from on top of said diaphragm 428.

As will be seen in Figure 10, the lower end of said box 444 is connected to said cap 423 by a longitudinal passageway 496 extending from said box to a counterbore 497 in the lower end of the reduced pin 442 of said collar. The lower end of said bore 473 has an externally screw-threaded plug 498 mounted therein, which has a stop or set screw 499 threaded therethrough. This screw may be adjusted to limit the downward travel of said valve stem 494. A lock nut 500 is threaded onto said set screw to lock the same in place after said set screw has been adjusted. The operation of this form of the invention is the same as that set forth for the other form and a detailed operation thereof will not be given.

While the invention has been shown and described as controlling and regulating the flow of a fluid through a line, the invention is not to be limited to this one use as it may be readily and easily changed to hold and maintain a predetermined back pressure on a flow line.

Various changes, alterations and modifications may be made in the shape, size and arrangement of the hereindescribed elements, within the scope of the appended claims.

What I claim and desire to secure by Letters Patent is:

1. In a pressure regulator including, a housing, fluid flow control means on the housing for controlling the flow of fluid through said housing, said flow control means being so constructed as to be either fully opened or completely closed, a pressure reducer connected to the delivery side of the regulator and spaced therefrom for reducing the pressure of the fluid flowing through the housing and the flow control means, fluid operated means connected to the delivery side of the pressure reducer for actuating said control means, means for governing the application of the discharged fluid to said fluid operated means, and means for releasing the discharged fluid from said fluid operated means.

2. In a pressure regulator including, a housing, fluid flow control means mounted on the housing for controlling the flow of fluid through said housing, said control means being so constructed as to be either fully opened or completely closed, a pressure reducer connected to the delivery side of the regulator for reducing the pressure of the fluid flowing through the housing and the flow control means, fluid operated means connected to the delivery side of the pressure reducer for actuating said control means, means for governing the application of the discharged fluid to said fluid operated means, and means for releasing the discharged fluid from said fluid operated means, said releasing means being actuated by said governing means.

3. In a pressure regulator including, a housing, fluid flow control means mounted on the housing for controlling the flow of fluid through said housing, said control means being so constructed as to be either fully opened or completely closed, a pressure reducer connected to the delivery side of the regulator for reducing the pressure of the fluid flowing through the housing and the flow control means, fluid operated means connected to the delivery side of the pressure reducer for actuating said control means, an adjustable means for governing the application of the discharged fluid to said fluid operated means, and means for releasing the discharged fluid from said fluid operated means.

4. In a pressure regulator including, a housing, fluid flow control means mounted on the housing for controlling the flow of fluid through said housing, said control means being so constructed as to be either fully opened or completely closed, restricting means connected to the delivery side of the regulator and spaced therefrom for reducing the pressure of the fluid flowing through the housing and the flow control means, fluid operated means connected to the delivery side of the restricting means for actuating said control means, an adjustable means for governing the application of the discharged fluid to said fluid operated means, and means for releasing the discharged fluid from said fluid operated means, said releasing means being actuated by said adjustable means.

5. A pressure regulator including, a housing having an inlet and an outlet, a valve adapted to close with fluid flow for controlling the flow of fluid between the inlet and outlet, a flow restrictor connected to said outlet and spaced therefrom, a pressure responsive device for actuating the valve, whereby said valve discharges substantially the same pressure into the outlet as received from the inlet, means for applying fluid pressure from the outlet of said flow restrictor to said responsive means to open said valve when the pressure downstream of said restrictor reaches a predetermined value and for exhausting the pressure applied to said pressure responsive means to the atmosphere when the pressure downstream of said flow restrictor reaches another predetermined value, whereby said valve is either fully opened or completely closed without an intermediate position.

6. In a fluid flow control device the combination with a high pressure fluid supply, of a conductor for conveying high pressure fluid from said supply, means in said conductor for reducing the pressure of said high pressure fluid, enclosed flow control means tending to close with fluid flow connected in said conductor in advance of and separate from the pressure reducing means and having a full open passage therethrough, whereby the flow control means discharges substantially the same pressure to said reducing means as received from the conductor, said reducing means being spaced from said flow control means, means for applying to the control means the force of the reduced pressure of the fluid, and means for amplifying the active force of said reduced pressure to operate said control means to control the flow of fluid through said conductor.

7. The combination with a high pressure fluid flow line, of a diaphragm valve tending to close with fluid flow connected in said line and having a full opened passage therethrough so that the valve is either fully opened or completely closed and any intermediate position is eliminated, a pressure reducer connected in said line beyond said valve and spaced therefrom, whereby said valve discharges substantially the same pressure as received, means for conveying fluid at its reduced pressure from beyond said reducer to said valve to open the latter against the flowing pressure of the fluid, and means for venting the reduced actuating fluid to the atmosphere to close said valve with the flowing pressure of the fluid.

8. The combination with a well head and a flow line leading from said head for conducting hydro-carbon fluids under temperatures and high pressures causing freezing of mechanism when the pressure of the flowing stream is reduced, of a valve tending to close with fluid flow that is either fully opened or completely closed and all intermediate positions are eliminated, the valve having a high pressure side and a low pressure side and being connected on its high pressure side with the flow line, a pressure reducer in said line beyond said valve and spaced therefrom for reducing the pressure of the flowing stream whereby said valve discharges substantially the same pressure to the reducer as received, means connected with said line beyond said reducer for by-passing a portion of the reduced pressure fluid to the low pressure side of said valve, means in said valve subject to operation by said low pressure fluid for actuating said valve in opposition to said high pressure fluid to begin the flow of said high pressure fluid through said valve, and means in said valve for venting said low pressure fluid from said valve to the atmosphere to permit the high pressure fluid to close said valve.

9. In a fluid flow control system the combination of, a fluid flow line, a regulator connected in said flow line and adapted to be closed by the flow of fluid through said line, the regulator being so constructed as to discharge substantially the same pressure as received and to be either fully opened or completely closed without any intermediate positions, a choke body having a bore extending therethrough mounted in said flow line on the discharge side of said regulator and spaced therefrom, a condensation chamber connected to said flow line on the discharge side of said regulator beyond said choke, and a by-pass line connected to said flow line beyond said choke means and leading to said regulator.

10. In a pressure regulator including, a housing, fluid flow control means mounted in the housing for controlling the flow of fluid through said housing and adapted to close with the flow of fluid, said flow control means being so constructed as to be either fully opened or completely closed and eliminating any intermediate position, whereby said flow control means discharges substantially the same pressure as received, fluid operated means connected to the delivery side of said housing for actuating said control means, means for governing the application of the discharged fluid to the fluid operated means, and means for releasing said discharged fluid from said fluid operated means to the atmosphere, the releasing means being actuated by said governing means.

11. In a pressure regulator including, a housing, fluid control means mounted in the housing for controlling the flow of fluid through said housing and adapted to close with the flow of fluid, and said control means being so constructed as to be either fully opened or completely closed and eliminating all intermediate positions, whereby said flow control means discharges substantially the same pressure as received, fluid operated means connected to the delivery side of said housing for actuating said control means, and adjustable means for governing the application of the discharged fluid to said fluid operated means, and means for releasing the discharged fluid from said fluid operated means to the atmosphere.

12. In a pressure regulator including, a housing, fluid flow control means mounted in the housing for controlling the flow of fluid through said housing and adapted to close with the flow of fluid therethrough, the control means being so constructed as to be either fully opened or completely closed and eliminating any intermediate position, whereby said flow control means discharges substantially the same pressure as received, fluid operated means connected to the delivery side of said housing and actuating said control means, adjustable means for governing the application of the discharged fluid to said fluid operated means, and means for releasing the discharged fluid from said operated means to the atmosphere, said releasing means being actuated by said adjustable means.

13. In an apparatus for regulating the flow of a fluid including, valve means for controlling the flow of a fluid and adapted to be closed with the flow of fluid, said valve means being so constructed as to be either fully opened or completely closed and eliminating all intermediate positions, whereby said flow control means discharges substantially the same pressure as received, fluid operated means for actuating said valve means, and adjustable means for governing the application of an actuating fluid to said fluid operated means, and means for releasing the actuating fluid from said fluid operated means to the atmosphere.

14. In an apparatus for regulating the flow of a fluid including, means for controlling the flow of a fluid including, means for controlling the flow of a fluid and adapted to be closed with the flow of fluid, said valve means being so constructed as to be either fully opened or completely closed and eliminating any intermediate position, whereby said valve means discharges substantially the same pressure as received, fluid operated means for actuating said valve means, adjustable means for governing the application of an actuating fluid to said fluid operated means, and means for releasing the actuating fluid from said fluid operated means to the atmosphere, said releasing means being actuated by said adjustable means.

15. In an apparatus for regulating the flow of the fluid including, valve means adapted to be closed by the flow of the fluid for controlling the flow of said fluid, said valve means being so constructed as to be either fully opened or completely closed and eliminating any intermediate position, whereby said valve means discharges substantially the same pressure as received, fluid operated means for actuating said valve means, means beyond the valve means for reducing the pressure of the fluid discharged from said valve means, means mounted to operate independently of said valve actuating means for applying the reduced pressure to the fluid operated means, and means for releasing this pressure from said fluid operated means to the atmosphere.

16. A regulator including, a fluid flow control body, valve means in the body adapted to be closed by the flow of fluid through said body, said valve means being so constructed as to be either fully opened or completely closed and eliminating any intermediate position, whereby said valve means discharges substantially the same pressure as received, diaphragm operated means for actuating said valve means, fluid actuated means for controlling the flow of a pressure fluid on to said diaphragm operated means, and means operated by the fluid actuated means for releasing the pressure fluid from said diaphragm operated means to the atmosphere to discontinue the operation of said diaphragm operated means when the discharge pressure has been obtained.

17. In an apparatus for regulating the flow of a fluid including, valve means adapted to be closed by the flow of a fluid through the apparatus for controlling the flow of the fluid, the valve means being so constructed as to be either fully opened or completely closed and eliminating any intermediate position, whereby said valve means discharges substantially the same pressure as received, restricting means connected by the apparatus for reducing the pressure of the fluid flowing therethrough, fluid operated means for actuating said valve means, an adjustable means for governing the application of an actuating fluid to said fluid operated means, and means for releasing the actuating fluid from said fluid operated means to the atmosphere.

18. In an apparatus for regulating the flow of a fluid including, valve means adapted to be closed by the flow of a fluid through the apparatus for controlling the flow of the fluid, said valve means being so constructed as to be either fully opened or completely closed and eliminating all intermediate positions, whereby said valve means discharges substantially the same pressure as received, restricting means connected in the apparatus for reducing the pressure of the fluid flowing therethrough, fluid operated means for actuating said valve means, and adjustable means for governing the application of an actuating fluid to said fluid operating means, and means for releasing the actuated fluid from said fluid operated means to the atmosphere said releasing means being actuated by said adjustable means.

19. In an apparatus for regulating the flow of a fluid including, valve means adapted to be closed by the flow of the fluid flowing through the apparatus for controlling the flow of said fluid, said valve means being so constructed as to be either fully opened or completely closed and eliminating all intermediate positions, whereby said valve means discharges substantially the same pressure as received, restricting means connected to the delivery side of the apparatus and spaced therefrom for reducing the pressure of said fluid flowing through said housing and said valve means, fluid operated means for actuating said valve means, means for applying the reduced pressure of the regulating apparatus to the fluid operated means, and means for releasing this pressure from said fluid operated means to the atmosphere.

20. A regulator including, a fluid flow control body, valve means in the body adapted to be closed by the flow of a fluid through said body, said valve means being so constructed as to be either fully opened or completely closed and eliminating all intermediate positions, whereby said valve means discharges substantially the same pressure as received, a pressure reducer connected to the delivery side of said body and spaced therefrom for reducing the pressure of the fluid flowing through said body and said valve means, diaphragm operated means for actuating said valve means, fluid actuated means for controlling the flow of a pressure fluid on the diaphragm operated means, and means operated by the fluid actuated means for releasing the pressure fluid from said diaphragm operated means to the atmosphere to discontinue the operation of said diaphragm operated means when the desired pressure has been obtained.

21. A fluid control device including, a housing having a fluid inlet and a fluid outlet and a valve seat therebetween, a control valve movable in said housing and engaging said seat, pressure fluid responsive means for actuating said control valve, an enclosure having a vent to the atmosphere and a pressure fluid outlet connected with the pressure fluid responsive means, a release valve in the enclosure free from the control valve disposed to alternately open and close the vent and the outlet thereof, a fluid conductor element movable in the enclosure free from the release valve for supplying pressure fluid to the enclosure and mounted to engage and operate the release valve, and a second pressure fluid responsive means connected with the conductor element for operating the latter and having a pressure fluid inlet communicating with the conductor element.

JEDDY D. NIXON.